United States Patent
Seddon et al.

(10) Patent No.: US 7,272,282 B1
(45) Date of Patent: Sep. 18, 2007

(54) FIBER OPTIC CABLES AND ASSEMBLIES SUITABLE FOR DISTRIBUTION

(75) Inventors: David Alan Seddon, Hickory, NC (US); Warren W. McAlpine, Hickory, NC (US)

(73) Assignee: Corning Cable Systems. LLC., Hickory, NC (US)

( * ) Notice: Subject to any disclaimer, the term of this patent is extended or adjusted under 35 U.S.C. 154(b) by 0 days.

(21) Appl. No.: 11/496,556

(22) Filed: Jul. 31, 2006

(51) Int. Cl.
*G02B 6/44* (2006.01)

(52) U.S. Cl. .................... 385/106; 385/100; 385/101; 385/103; 385/107; 385/110; 385/112; 385/113; 385/114

(58) Field of Classification Search ............... 385/100, 385/101, 102, 103, 105, 106, 107, 110, 112, 385/113, 114, 141
See application file for complete search history.

(56) References Cited

U.S. PATENT DOCUMENTS

| | | | |
|---|---|---|---|
| 3,887,265 A | 6/1975 | Margolis et al. | 350/96 B |
| 4,401,361 A | 8/1983 | Slaughter | 350/96.23 |
| 4,420,220 A | 12/1983 | Dean et al. | 350/96.23 |
| 4,729,628 A | 3/1988 | Kraft et al. | 350/96.23 |
| 4,836,639 A * | 6/1989 | Shamoto et al. | 385/109 |
| 5,039,195 A * | 8/1991 | Jenkins et al. | 385/101 |
| 5,155,304 A | 10/1992 | Gossett et al. | 174/117 R |
| 6,501,888 B2 | 12/2002 | Gimblet et al. | 385/113 |
| 6,542,674 B1 | 4/2003 | Gimblet | 385/113 |
| 6,714,710 B2 | 3/2004 | Gimblet | 385/113 |
| 7,050,685 B2 * | 5/2006 | Plemmons et al. | 385/109 |
| 7,197,215 B2 * | 3/2007 | Baird et al. | 385/113 |
| 2003/0059181 A1 * | 3/2003 | Jackman et al. | 385/102 |
| 2006/0127016 A1 * | 6/2006 | Baird et al. | 385/113 |
| 2006/0193574 A1 * | 8/2006 | Greenwood et al. | 385/103 |

* cited by examiner

*Primary Examiner*—Brian M. Healy

(57) ABSTRACT

Fiber optic cables and assemblies useful for distribution of the optical fibers to a network are disclosed. The fiber optic cables include a first strength component and a second strength component with a cable jacket generally surrounding the first and second strength components. One or more compartments are defined between the first and second strength components for housing one or more optical fibers. The optical fibers of the fiber optic cable are easily accessible by the craft for distribution to the network, thereby allowing the construction of assemblies that are suitable for distribution of the optical fibers to the network.

33 Claims, 15 Drawing Sheets

FIBER OPTIC CABLES AND ASSEMBLIES SUITABLE FOR DISTRIBUTION

FIELD OF THE INVENTION

The present invention relates to fiber optic cables having structural cable features for individually accessing the one or more groups of optical fibers for distribution purposes. Additionally, the invention is directed to distribution assemblies using cables of the present invention.

BACKGROUND OF THE INVENTION

With the recent development of "Fiber-to-the-Premises" ("FTTP") networks, it is often desirable to access and terminate pre-selected optical fibers at predetermined locations along the length of a fiber optic cable, thus providing one or more access locations for distributing the optical fibers. For instance, access locations provide a distribution point from the fiber optic cable leading to another distribution point, or a drop point from the fiber optic cable leading toward to the subscriber, thereby extending the reach of the optical communications network towards the subscriber or user. Based on the large number of access locations needed in an optical network, it would be desirable to employ fiber optic cables within those networks whose cable design facilitates accessing optical fibers for distribution at desired access locations.

Conventional fiber optic cables, however, can include undesirable structural features that make optical fiber access difficult. One example of a conventional fiber optic cable is a stranded loose tube design. While the stranded loose tube design has certain advantages such as a round cable shape which aids in installation and favorable compression and tensile windows, there are disadvantages with respect to accessing optical fibers at a predetermined access locations. More specifically, accessing optical fibers of a stranded loose tube cable design using a conventional method requires the following steps: (1) Penetrating and removing a substantial length of the cable jacket in order to expose the underlying strength elements and buffer tubes; (2) Cutting the strength elements in the cable; (3) Accessing the appropriate buffer tube at a first access point; (4) Separating the optical fibers to be accessed; (5) Severing the pre-selected optical fibers at the first access point; (6) Removing the severed optical fibers through a second access point that is upstream from the first; (7) Splicing or otherwise terminating the removed optical fibers; and (8) closing and/or protecting the accessed buffer tube and the exposed section of the cable. Thereafter, the accessed optical fibers are then typically spliced or otherwise optically connected to optical fibers of a tether or drop cable for distribution toward the subscriber. These steps for access are not only time consuming to perform, but must often be accomplished by a highly-skilled technician because of the difficulty and/or danger of damaging optical fibers. Additionally, closing and/or protecting the cable breach at the access location can result in a relatively large or stiff portion of the cable that does not fit through pulleys, sheaves, or the like.

Accordingly, there is a specific and unresolved need for fiber optic cable designs that facilitate the easy access of optical fibers at predetermined access locations along the length of the fiber optic cable. It would also be desirable to provide a fiber optic cable that avoided the steps and difficulties associated with stranded loose tube cable designs.

SUMMARY OF THE INVENTION

One aspect of the present invention is directed to a fiber optic cable having a plurality of optical fibers, a first strength component, and a second strength component. The strength components are generally aligned along a neutral axis of the fiber optic cable and are surrounded by a cable jacket. A plurality of compartments are defined by the cable jacket and disposed in a generally flat array between the first strength component and the second strength component and the compartments respectively house one or more of the plurality of optical fibers. The cable jacket also includes at least one access feature for individually opening one or more of the plurality of compartments for accessing one of the optical fibers therein. Consequently, the fiber optic cable is useful for making distribution cable assemblies.

In another aspect, the present invention is directed to a fiber optic cable having a first strength component, a second strength component, a plurality of tubular components having one or more optical fibers therein, and a cable jacket. The plurality of tubular components are arranged generally in one or more flat arrays between the first strength component and the second strength component. The cable jacket surrounds the plurality of strength components and the plurality of tubular components and includes a compartment adjacent to the first strength member. One or more of the plurality of tubular components rotate into the compartment along a length of the fiber optic cable, thereby allowing access for distribution.

In another aspect, the present invention is directed to a fiber optic cable that forms a portion of a fiber optic cable assembly for distribution of the optical fibers. The fiber optic cable assemblies include a plurality of optical fibers, a first strength component, a second strength component, and a cable jacket. The cable jacket surrounds the first and second strength components and defines a plurality of compartments disposed one or more generally flat arrays, wherein the plurality of compartments respectively house one or more of the plurality of optical fibers. At least one of the plurality of optical fibers protrudes from the cable jacket and has a demarcation point for inhibiting movement, thereby defining the at least one distribution optical fiber. In other variations, a transition tube is disposed about the at least one distribution optical fiber for protecting the same.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

DETAILED DESCRIPTION OF THE INVENTION

Figure 1:
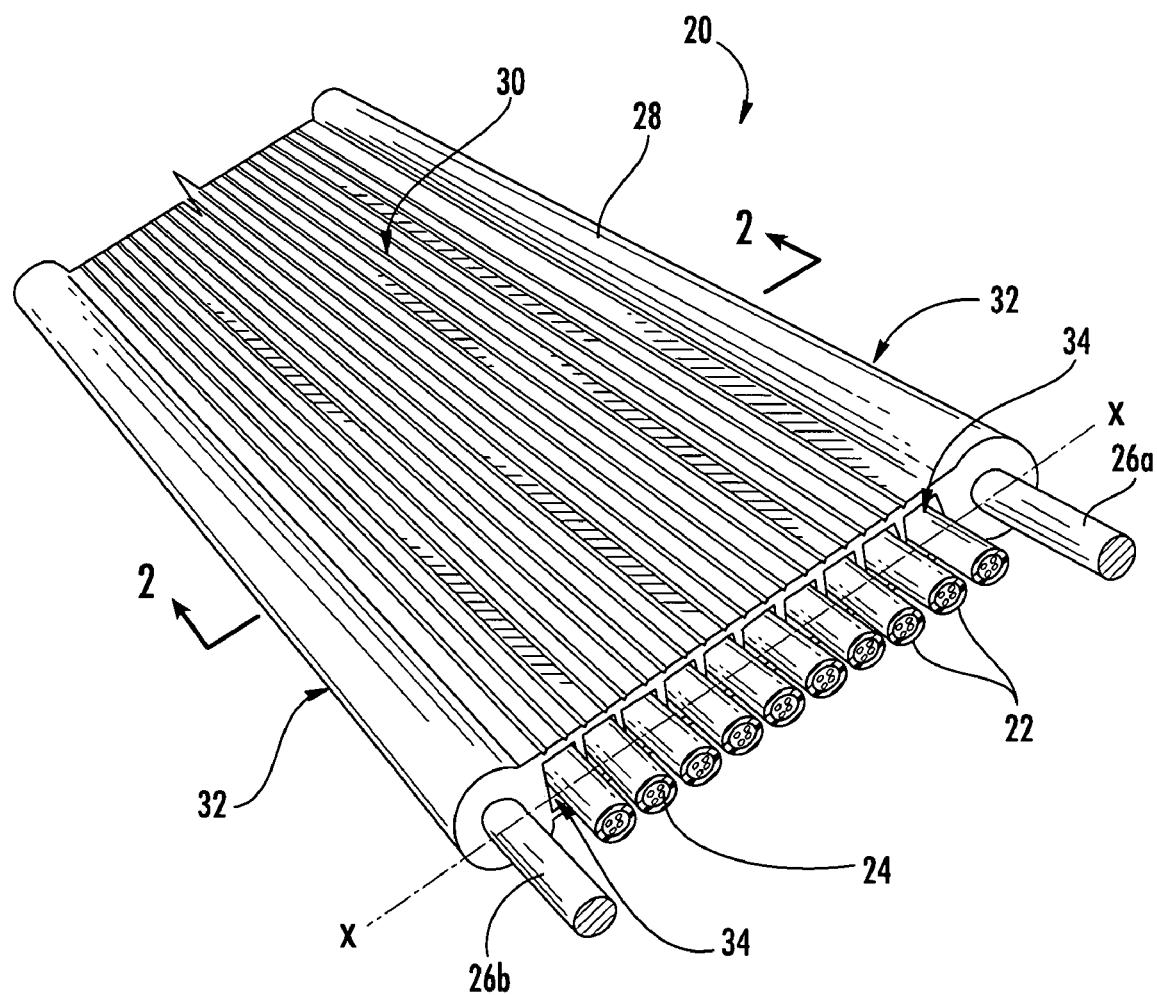
FIG. 1 is a perspective view of a fiber optic cable according to an explanatory embodiment of the present invention.

Reference will now be made in detail to the present preferred embodiments of the invention, and examples of which are illustrated in the accompanying drawings. Whenever possible, the same reference numerals will be used throughout the drawings to refer to the same or like parts. Fiber optic networks use distribution cables assemblies for routing the optical fiber towards the subscriber at predetermined positions along the distribution cable. Various embodiments of the present invention have one or more compartments that allow quick and easy access to the optical fibers of the fiber optic cable at desired access locations along the length of the cable, thereby making them advantageous as distribution cables. Moreover, the fiber optic cable structures provide protection against crush and impact forces placed on the cable and further provide a preferential bend for the cable, thereby inhibiting breakage of the optical fibers due to axial tension stresses induced by bending and the like. The fiber optic cable examples shown and described herein are particularly well suited as fiber optic distribution cables in optical networks for providing fiber-to-the-premises (FTTP), fiber-to-the-home (FTTH) or fiber-to-the-curb (FTTC), referred to generically as FTTx applications where quick and easy access to optical fibers at predetermined positions along the cable length is required. Additionally, cables of the present invention can have other applications that require multiple distribution locations such as wireless systems that use picocell architecture. Simply stated, accessing optical fibers and/or optical components at predetermined mid-span access locations along the cable length is accomplished by opening one or more of the desired compartments. After accessing the predetermined optical fibers at the desired access locations, other useful cable assemblies can be constructed such as distribution cables having plug and play connectivity for distributing the optical fiber network toward the subscriber.

Figure 2:
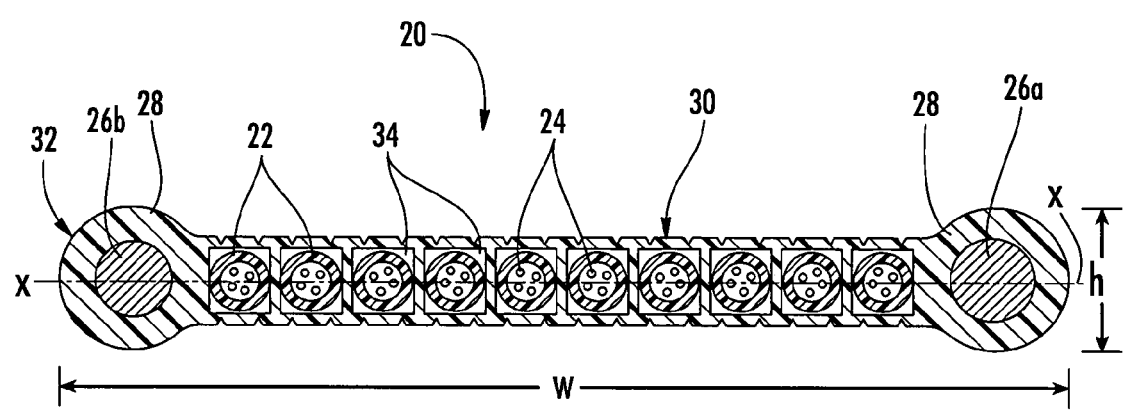
FIG. 2 is a cross-sectional view of the fiber optic cable of FIG. 1 taken along line 2-2.
Figure 3:
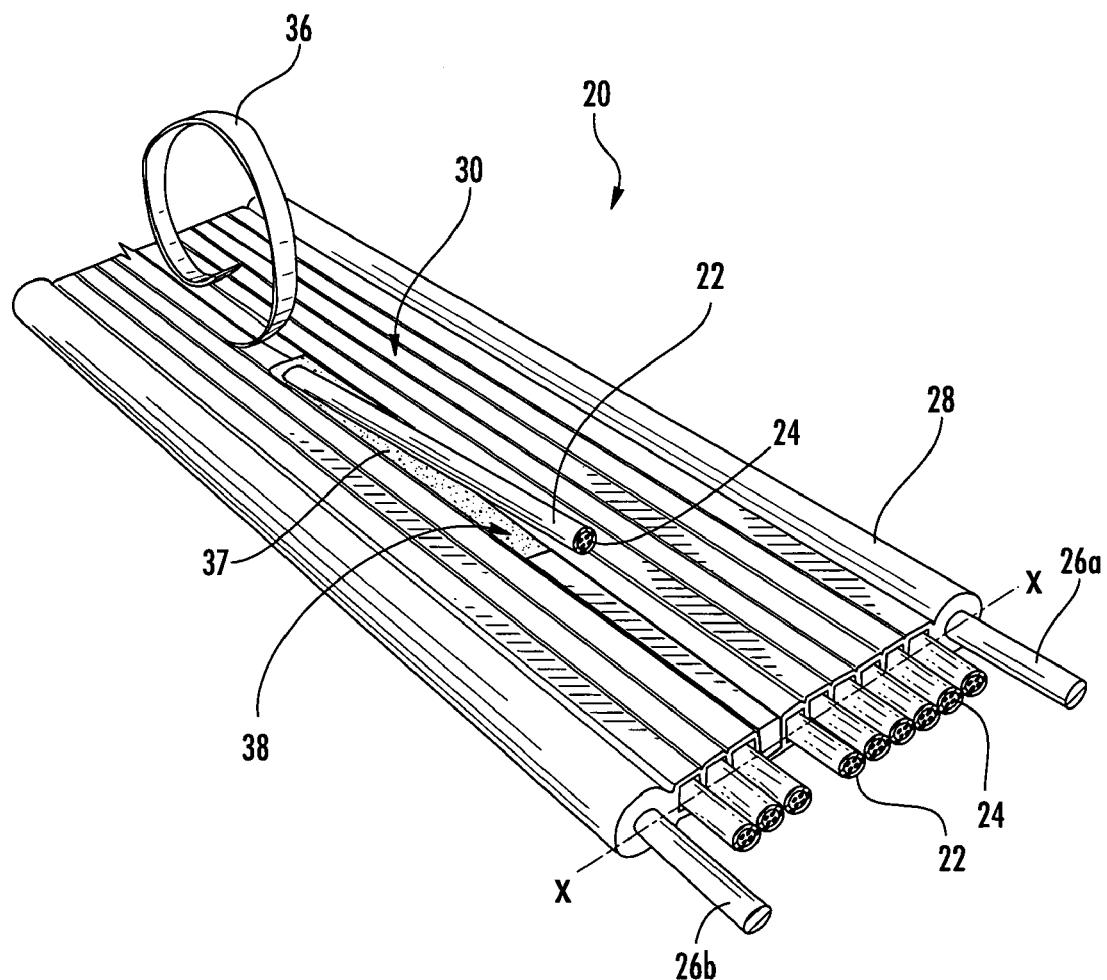
FIG. 3 is a perspective view of the fiber optic cable of FIG. 1 illustrating a cable access point for accessing one of the plurality of tubular components.

FIGS. 1-2 respectively depict a perspective view and a cross-sectional view of a fiber optic cable 20 having a plurality of optical fibers 24 disposed within a cable jacket 28 defining a plurality of compartments 34 that are arranged in one or more generally linear arrays between a first strength component 26a and a second strength component 26b. Compartments 34 of fiber optic cable 20 are individually constructed so that each compartment is easily be entered by the craft without disrupting (i.e., opening or exposing) the other compartments of the fiber optic cable. In other words, once one of the compartments 34 is opened then one or more of the optical fibers 24 therein are accessible as depicted in FIG. 3. More specifically, fiber optic cable 20 includes a plurality of a tubular components 22 such as a buffer tube or the like having at least one optical fiber 24 therein that is disposed within the plurality of individual compartments 34 of fiber optic cable 20. Preferably, tubular components 22 are not attached and/or do not stick to cable jacket 28 so they are easily removed from compartment 34. Thus, fiber optic cable 20 is advantageous because the craft has quick and easy access to the tubular components and/or optical fiber(s) within a predetermined compartment without disturbing the other compartments. Consequently, only a small portion of the fiber optic cable that is opened (i.e., the compartment) requires closing and/or sealing, thereby leaving a relatively small footprint at the access location.

Figure 2A:
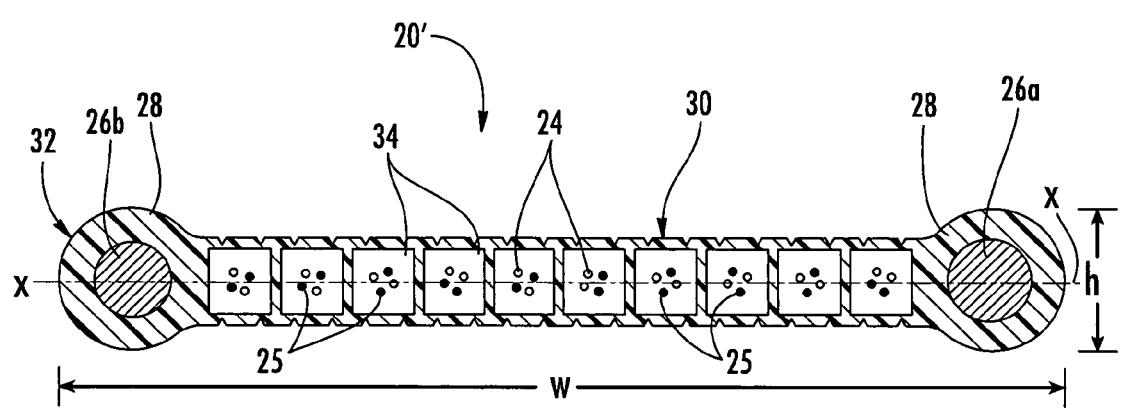
FIG. 2*a* is a cross-sectional view of another fiber optic cable of the present invention.

Fiber optic cable 20 allows easy access to at least one optical component such as tubular component 22 having optical fibers 24 therein, but other variations could also allow quick and easy access to other configurations within the compartment. By way of example, compartments could also include one or more copper wires such as a twisted pair. Tubular component 22 provides added protection for optical fibers 24 after the compartment is opened. Additionally, tubular components 22 may include any suitable optical fiber count such as 1, 2, 4, 6, 8 or 12 individual optical fibers 24 for creating the desired optical fiber cable count. As shown, tubular component 22 is a buffer tube, but in other embodiments could be micromodule or other protective covering. Of course, the concepts of the present invention may be used with cable configurations that eliminate the tubular component and/or have other features as discussed herein. Illustratively, FIG. 2a depicts a fiber optic cable 20', which is similar to fiber optic cable 20, but uses optical fibers loosely disposed in compartments 34 (i.e., no tubular components) along with one or more water-swellable components 25 such as a water-swellable yarn. Furthermore, fiber optic cables according to the present invention can have optical fibers packaged in other ways such as ribbons, buffered optical fibers, or the like. Moreover, fiber optic cables of the present invention may include any suitable type of optical fiber such as single mode or multi-mode or any type of light waveguide now known or hereafter developed. Also, the various components of the fiber optic cables 20 may be modified, added, or removed in order to meet performance requirements such as a desired aerial span, environmental conditions, fiber count and/or installation or rated tensile load.

Fiber optic cable 20 has a generally flat geometry because of the generally flat arrangement of compartments 34 in a linear array along with strength components 26a,26b disposed at the ends of the linear array. As shown, cable jacket 28 defines generally flat sides 30 and generally arcuate ends 32. Compartments 34 are sized so that a clearance is provided between tubular component 22 and its compartment, thereby allowing some movement of the tubular component 22 within the compartment 34. Although compartments 34 are depicted as generally square they may have other shapes such as rectangular, round, or other suitable shapes. The width w of the fiber optic cable 20 is dependent upon the size and number of compartments 34 in the compartment array along with the strength components selected. A height h of the fiber optic cable 20 is also dependent upon the number of rows of compartments in the array and on the size of the compartments. By way of example, if tubular component 22 has an outer diameter of about 3 millimeters, then compartment 34 has a generally square opening of about 3.5 millimeters per side. As depicted, a typical size for fiber optic cable 20 is a width w of about 50 millimeters and a height of about 8 millimeters, but other sizes are possible according to the invention.

Strength components 26a,26b may be any suitable material such as steel wires, fiberglass, aramid fibers, glass reinforced plastic (GRPs), suitable combinations or the like for the given application. For instance, strength components 26a,26b can be conductive such as copper or copper-cladded steel if desired for supplying electrical power. If a dielectric design is desired, strength components 26a,26b such as GRPs that provide both tensile and anti-buckling characteristics may be used. In still other embodiments, strength components 26a,26b may include a coating adhered to their outer surface such as a water-swellable coating, but other coatings are possible such as for adhesion with the cable jacket. Although the cable embodiments shown include a pair of rod-shaped strength components positioned on opposing sides of the cable, it is envisioned that a cable could have a single strength component or more than two strength components. Further, the strength components could have other shapes besides round for inhibiting bending along an undesired bend axis. Moreover, fiber optic cables of the present invention have the necessary strength and robustness to withstand the necessary mechanical and optical testing such as crush, impact, tension, and temperature cycling for the intended environment. For instance, the concepts described herein can be applied to many different cable applications, for example, self-supporting, buried, indoor, and indoor/outdoor cable applications. In further aspects of the present invention, fiber optic cables can include a fibrous strength member such as fiberglass that generally lacks anti-buckling strength along with strength component such as a GRP as the strength system. By way of example, a tensile strength rating ratio between the fiberglass and the GRP is about 0.1 to about 0.5. The combination of the strength components and strength members, with their respective select tensile strength ratings, allows fiber optic cables of the present invention to withstand high tensile loads and yet have a suitable bending flexibility.

Additionally, cables of the present invention are advantageous because optical fibers are positioned relatively close to the neutral axis in order to prevent path length differences in the optical fibers which may lead to optical fiber breakage and optical attenuation such as during bending of the cable. In other words, first strength component 26a and second component 26b are generally disposed along a plane in order to promote bending out of a neutral axis X-X. Neutral axis X-X is located at about the midpoint of the height h of the fiber optic cable 20. Strength components 26a, 26b provide tensile strength and a preferential bend along a neutral axis X-X that is common to both the strength components 26 and the optical transmission components. Similarly, tubular components 22 of fiber optic cable 20 are also generally disposed so that optical fibers 24 are relatively close to the neutral axis X-X, which is often difficult, if not impossible, in high fiber-count round cable constructions. Furthermore, the generally flat array of the fiber optic cables eliminates stranding as may be generally required with round loose tube fiber optic cables. The elimination of stranding permits the cable to be processed continuously on one manufacturing line. Additionally, if tubular components are ended at or near predetermined access locations, filler rods may be introduced into the fiber optic cable for filling the compartment.

Tubular components 22 are preferably formed of a polymeric material such as a polypropylene, polyvinylchorlide, polyethylene, blends thereof, or other like materials. Additionally, tubular component 22 is sized for accommodating the number of optical fibers 24 therein with a suitable excess fiber length. By way of example, if each tubular component 22 is suitable for holding twelve optical fibers it has an inner diameter of about 1.8 millimeters and an outer diameter of about 3 millimeters, then an excess fiber length (EFL) within the tubular component 22 in the range from about 0% to about 0.8% is preferred, while an EFL range from about 0.2% to about 0.3% is more preferred. Additionally, tubular component 22 can have excess length within compartment 34 and then the total EFL is the sum of the EFL of the optical fiber 24 within tubular component 22 and the excess length of the tubular component 22 with compartment. One way to create EFL is by back-tensioning strength members 26a,26b as they enter an extrusion head to apply cable jacket 28. In other words, strength members 26a,26b are paid-off respective reels under a relatively high tension (e.g. between about 100 to about 400 pounds) using respective strength member capstans, thereby elastically stretching the strength members 189 so that excess length is produced in the tubular components 22 or optical fibers 24 depending on the cable configuration. In other words, after the tension is released on strength members 189 they return to their original unstressed length (i.e. shorten), thereby producing EFL since the tubular components or optical fibers were introduced into the cable with about the same length as tensioned strength members and were not stretched. Consequently, part of EFL produced is equal to about the strength member strain plus any plastic shrinkage of the cable jacket that may occur. Tubular component 22 may also include other suitable components therein such as grease, gel, or a water-swellable component such as a yarn, tape, or powder. Likewise, similar materials may be included in any interstice of a cable for water-blocking. For example, at least one water-swellable tape, yarn, or powder can be disposed within compartment 34, but radially outward of tubular component 22'. In another embodiment, compartments can include ripcords (not shown) for tearing the cable jacket and opening the compartments.

Regardless of the cable components used, fiber optic cable 20 may be modified to provide the desired performance for the intended environment such as indoor and/or outdoor over a wide range of temperatures. Cable jacket 28 is preferably formed by a suitable polymer material such as a PVC or MDPE, but other polymeric materials are possible. The minimum average jacket thickness is about 0.75 millimeters, but other suitable thicknesses are possible based on the desired application. If intended for outdoor applications, cable jacket 28 preferably contains carbon black for providing ultraviolet light protection. The cable jacket material forms a molded body that provides an outer protective shell, maintains sealing integrity between the underlying components and the external environment and is capable of withstanding the required crush forces. The actual degree of flexibility, and in particular the bending and torsion flexibility, is dependent upon the material chosen, the geometry of the cable jacket 28 and the geometry of the underlying components. In other embodiments, one or more of the polymer materials selected are flame-retardant materials for achieving plenum, riser, or LSZH flame ratings.

Referring to FIG. 3, fiber optic cable 20 is shown with one compartment 34 opened along its length at the access location to individually access one or more desired distribution optical fiber(s) 24'. As depicted, the desired compartment 34 was opened along the generally flat portion 30 of cable jacket 28 by tearing a section 36 from cable jacket 28. As best shown in FIG. 2, cable jacket 28 include a plurality of stress concentrations (not numbered) for influencing the tear of section 36. In other words, an opening in cable jacket 28 was initiated and propagated along by lifting and peeling section 36 backwards to open the compartment. Of course, the torn open portion of section 36 can be cut from cable jacket 28 if it is peeled back as shown. Either one side or both sides of the fiber optic cable 20 can have the stress concentrations for similar sections 36 of cable jacket 28. Thus, a section of the cable jacket 28 can be removed at desired access location, thereby providing an access window to the desired compartment of cable jacket 28. Another way for accessing compartments is by using a cable access tool tailored for cutting into a single compartment of the fiber optic cable. After the craft exposes and presents the desired length of one or more distribution optical fibers 24' from the compartment, other optional steps may be performed for creating cable assemblies. By way of example, cable assemblies can include other components such as splicing tether optical fibers or preconnectorized ferrules, pigtails, plugs or receptacles for optical communication with the distribution optical fiber.

After a length of tubular component 22 is presented for distribution from fiber optic cable 20, a void 38 (i.e., opening) is left in the compartment. Typically, void 38 is closed and/or sealed. By way of example, a suitable material is applied or injected into void 38 as shown by the shaded portion, thereby creating a demarcation point 37 for inhibiting the movement of tubular component 22 during bending, for instance. Suitable materials for providing demarcation point 37 include silicone, polymers, adhesives, hot melts, epoxy or the like. However, the material used for demarcation should be compatible with the optical fiber, ribbons, tubular component and/or other components that it may contact. Demarcation point 37 serves several functions such as inhibiting water from migrating into and along the opened compartment, inhibiting propagation of the compartment opening, and/or providing demarcation at the transition to become a distribution optical fiber. Simply stated, the individual compartment that was opened at the access location point is closed and/or sealed in a suitable manner. The length of the opening at the access location may vary, but is preferably less than about 5 meters in length, although longer lengths are possible. For instance a typical access location has a length that is about 1 meter or less in length. Additional embodiments can use one or more other components at the access location with or without the demarcation point.

Figure 3A:
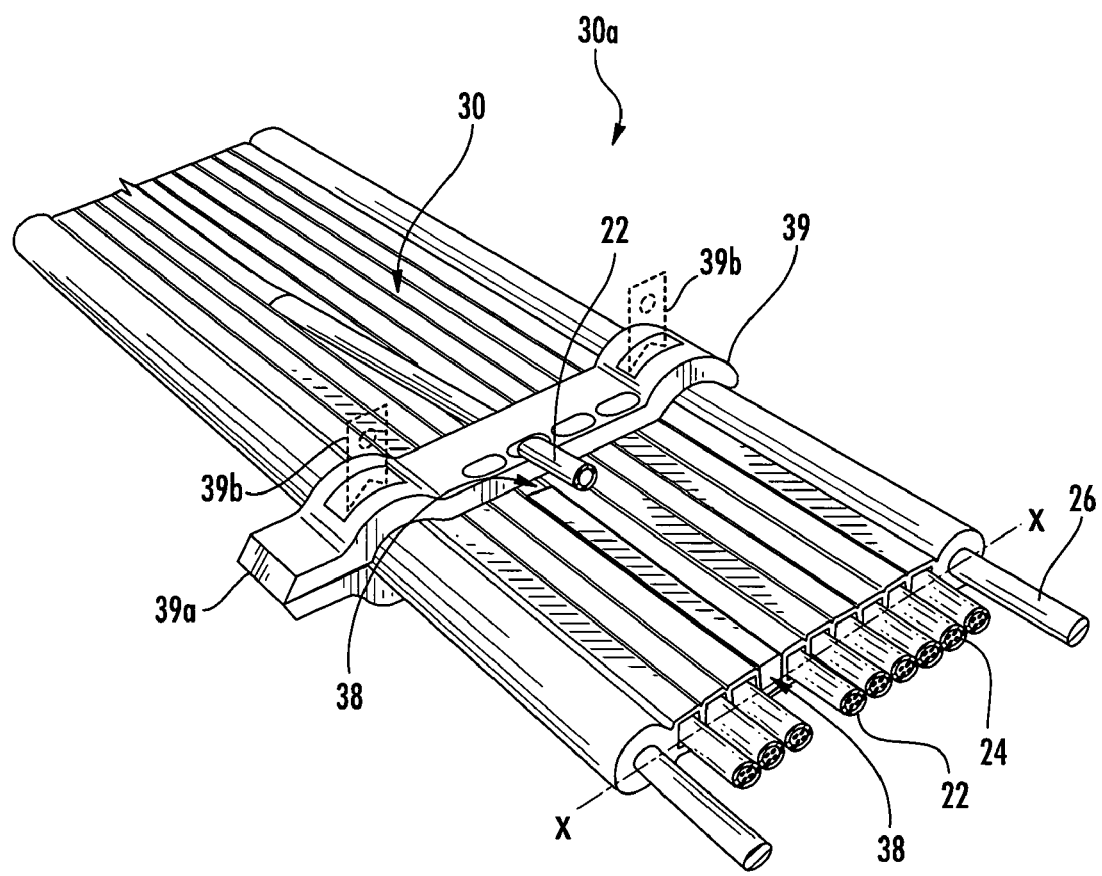
FIG. 3a is a perspective view of the fiber optic cable of FIG. 3 with a distribution guide near the access location according to the present invention.

FIG. 3a depicts a cable assembly 30a that further includes a distribution guide 39 disposed about access location 37 for mechanical support and/or electrical connection. Distribution guide 39 is made from one or more suitable materials such as metal and/or plastic and may attach to the cable in any suitable manner such as clamping, crimping, adhesive, etc. As shown, distribution guide 39 includes one or more apertures (not numbered) for routing tubular component 22 and/or the distribution optical fiber therethrough, thereby inhibiting further tearing of the opened compartment and providing some strain relief. Additionally, the apertures are angled with respect to the surface of the distribution guide 39 for providing a smooth transition and inhibiting kinking of the tube. Distribution guide 39 includes a flexible hinge 39a that allows opening and securing of the same about the fiber optic cable. After positioning distribution guide 39 at an access location 37, the free ends engage each other for securing the distribution guide about the fiber optic cable. Of course, any suitable means may be used for securing the free ends of the distribution guides such as tabs, screws, or the like. Distribution guide 39 may also optionally include a pair of insulation displacement contacts (IDCs) 39b as shown by the phantom lines near respective ends of distribution guide 39 for tapping electrical power from the cable. More specifically, IDCs 39b would slide within slots (not numbered) adjacent to electrically conductive strength components 26 for tapping power for connection to devices along the cable such as for wireless picocell applications that require power along with the optical connection. Moreover, the IDCs may have any suitable configuration for making the electrical connections with the desired components such as wires, pigtails, or electrical connectors. Distribution guide 39 may also be used with other components such as a boot, overmold, or heat shrink tubing, a guide tube, an indexing tube, splice protectors, pigtails having one or more ferrules, connectors, plugs, receptacles or other suitable components for making a cable assembly. Additionally, distribution cables can have multiple access locations along its length and use suitable components at respective access locations.

After accessing optical fibers for distribution, the cables disclosed herein are useful for making distribution cables assemblies. Distribution cable assemblies can further include preconnectorized pigtails having ferrules, receptacles, and/or connectors for plug and play connectivity according to the present invention. For instance, a splice is made between the optical fiber of the pigtail and the accessed optical fiber of the cable and the splice is immobilized using a splice protector, tube, or the like. Afterwards, the access location may optionally be sealed using a robust overmolded portion, heat-shrink tubing, or the like for keeping out environmental effects. Of course, variations of cables and/or distribution cable assemblies similar to fiber optic cable 20 are possible.

For instance, variations can include cables or assemblies that shuffle the optical fibers into a single compartment. Likewise, fiber optic cables may be pre-engineered to have tubular components and/or respective optical fibers cut to predetermined lengths (i.e., tapered optical fibers). Stated another way, specific optical fiber(s) extend for less than the entire cable length and correspond to predetermined access location(s) along the cable length that preferably have the mid-span access locations marked for the craft. If desired, the cable width of tapered cables may be reduced as the cable travels downstream, but this may increase manufacturing complexity.

Figure 4:
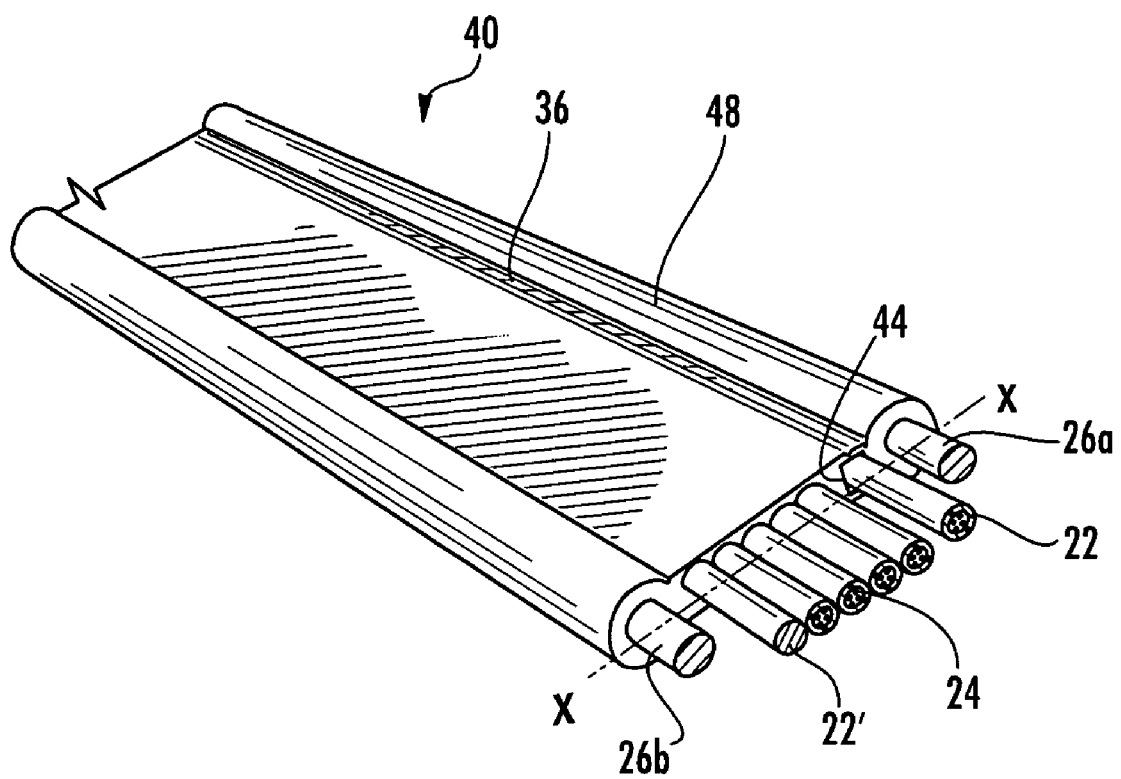
FIG. 4 is a perspective view of another fiber optic cable according to the present invention.

Illustratively, FIG. 4 depicts a fiber optic cable 40 having a tapered configuration that includes a plurality of optical fiber carrying tubular components 22 positioned in a generally flat array between an opposing pair of strength components 26a,26b. In contrast to fiber optic cable 20, all of the tubular components 22 in this embodiment are accessed through a single compartment 44 (or access location) defined by a cable jacket 48 near strength component 26b. Stated another way, the tubular components 22 do not extend for the entire length of the cable, but are shifted into compartment 44 for sequential accessing of the same at the end of its length along fiber optic cable 40. In other words, after one of the tubular component 22 within compartment 44 ends, the next adjacent tubular component 22 is introduced into compartment 44. Likewise, the other tubular components 22 shift toward compartment 44 for being shuffled into the compartment 44. As before, tubular components 22 are individually accessed at compartment 44 at a predetermined mid-span access point along the cable length by peeling back or removing a portion 36 of cable jacket 48 to open compartment 44 and expose an end portion of desired tubular component 22 therein. Cable jacket 48 is preferably marked to indicate the location where each tubular component 22 ends within compartment 44, thereby providing an indication to the craft where to open the cable for mid-span access for the given optical fibers. Consequently, fiber optic cable 40 is pre-engineered such that tubular components 22 have a predeteremined length and end near the designated mid-span access points. Fiber optic cable 40 preferably is engineered in process by removing a tubular component 22 from the array and replacing it with the next adjacent tubular component 22 as they are indexed across the array and back-filled with jacketing, epoxy material or a filler rod in order to maintain the dimensions of fiber optic cable 40. As depicted, fiber optic cable 40 includes a first filler rod 22' at the left-side of the cross-section to replace a tubular component. In other embodiments, the fiber optic cable can have a smaller width as tubular components are eliminated from the cable.

Figure 5:
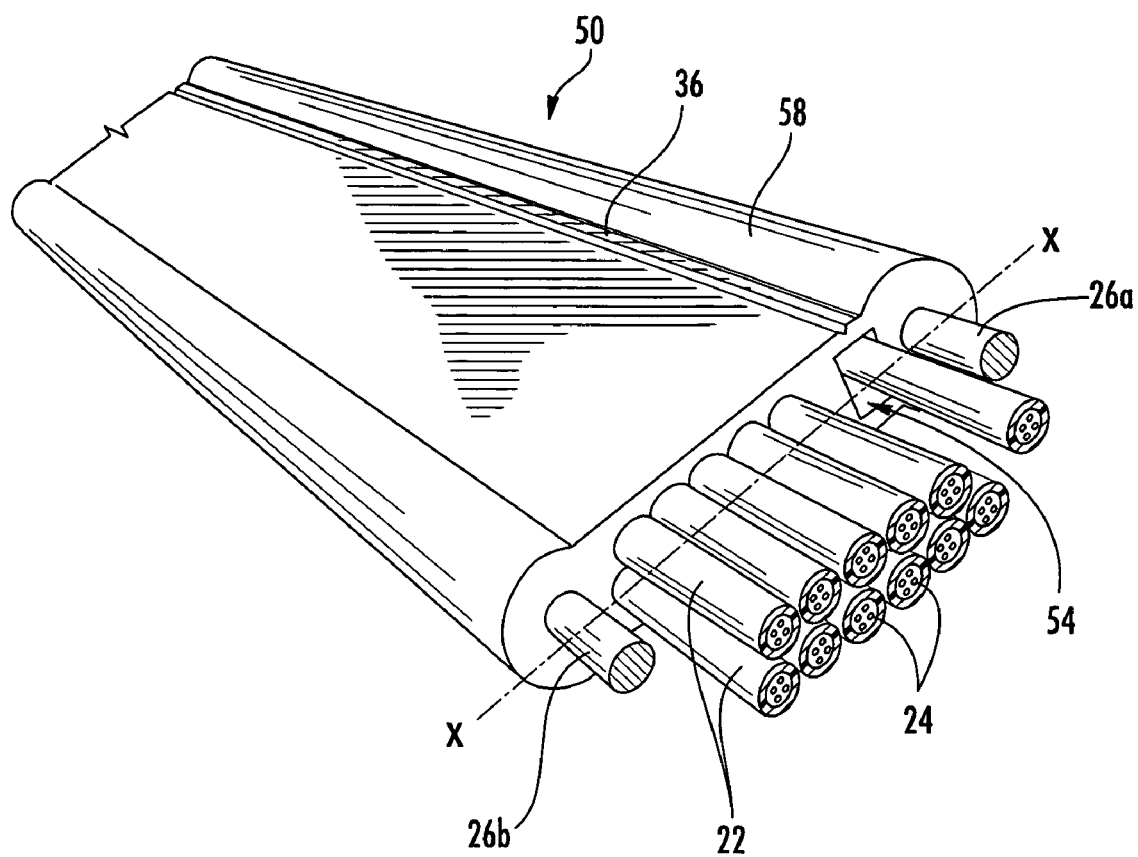
FIG. 5 is a perspective view of another fiber optic cable according to the present invention.

Referring to FIG. 5, a fiber optic cable 50 is shown that includes a plurality of optical fiber carrying tubular components 22 arranged in a generally flat array in multiple rows. This cable construction may be used in high fiber-count applications and generally speaking reduces the width of the fiber optic cable compared with a cable having a single row. In this cable, one or more tubular components 22 are shuffled into and out of a compartment 54 disposed at one end of fiber optic cable 50. As in the previous cable constructions, the optical fibers 24 are preferably located as close to the neutral axis X-X of the fiber optic cable 50 as possible. Excess optical fiber length is provided in the tubular components 22 and is related to the bend radius of the cable and the maximum allowable fiber strain. Alternative embodiments may include bend insensitive optical fibers that have reduced bend sensitivity. Like fiber optic cable 40, tubular components 22 are rotated into position during cable manufacture so that the tubular components 22 are presented to compartment 54 for sequential accessing, but the tubular component need not end and can return back to the main portion of the cable. Additionally, the cable jackets of fiber optic cables 40,50 may also define more than one compartment such as a compartment adjacent to each strength component. Also, compartments of fiber optic cables may have access windows on one or more sides of the cable jacket for accessing individual tubular components 22.

Figure 6:
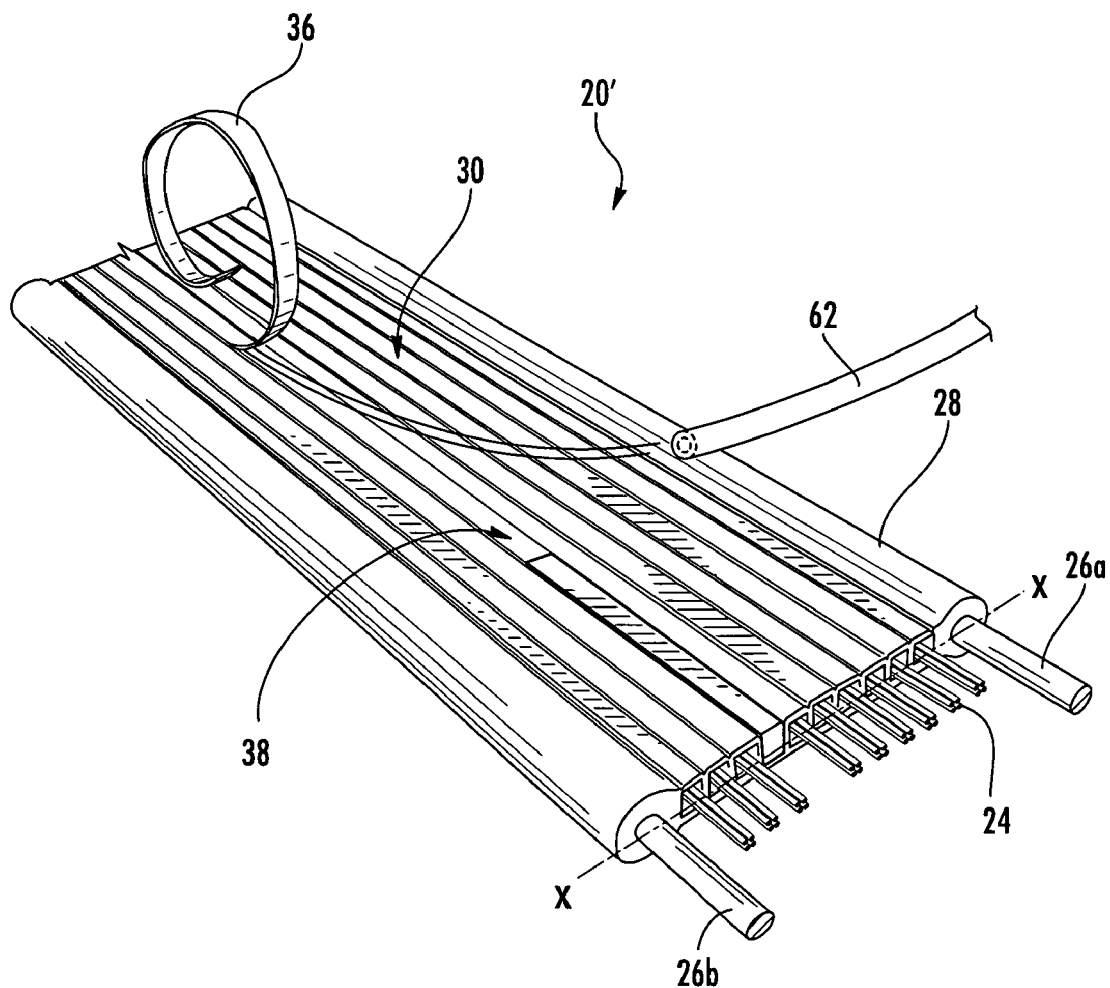
FIG. 6 is a perspective view of the fiber optic cable of FIG. 2a after opening a compartment at an access location during the construction of a cable assembly according to the present invention.

As discussed, fiber optic cables of the present invention may further include one or more components for making distribution fiber optic cable assemblies. Once a distribution optical fiber is presented the craft has several different options for distribution of the optical network toward the subscriber. For instance, if a cable omits tubular components and uses bare or tight buffered optical fibers in the compartments such as the cable of FIG. 2a, then a transition tube 62 may be slid over the distribution optical fibers 24' and may be pushed into a portion of distribution cable 30 as shown in FIG. 6. Transition tube 62 protects and routes distribution optical fibers 24' as they transition from a position within the cable to a position outside the cable for distribution. Transition tube 62 is formed from suitable material such as polymer that is relatively flexible. Then, if desired a demarcation point (not shown) can be applied as before to close the opened compartment. As before, the demarcation point generally inhibits the movement of the distribution optical fiber, transition tube, and/or inhibits the migration of water along the cable after opening the compartment. After accessing the distribution optical fiber and the optional demarcation point is formed, it is possible to construct other distribution cable assemblies. For instance, pre-selected optical fibers are presented at an access location for optical communication with a tether optical fiber, receptacle, fiber optic drop cable, or the like.

Figure 7:
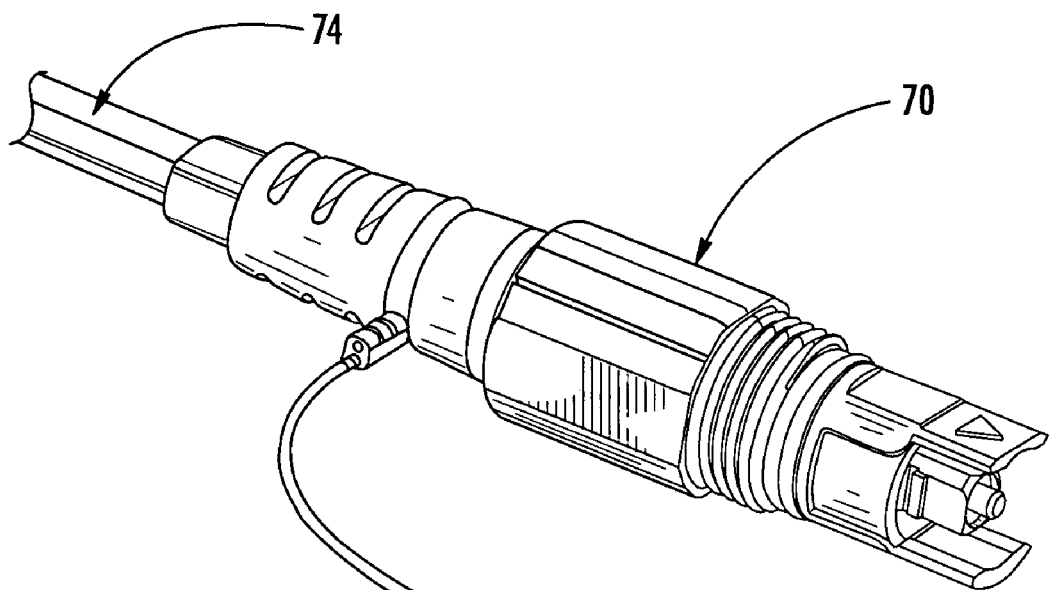
FIGS. 7-10 are perspective views showing exemplary configurations for optical connectivity for cable assemblies according to the present invention.
Figure 7:
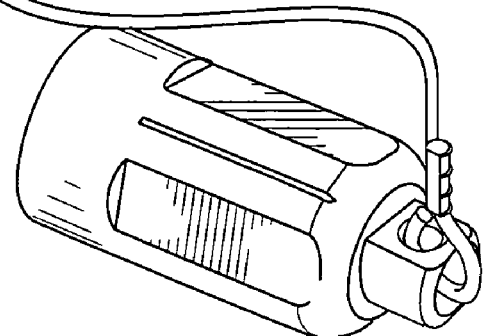
Figure 8:
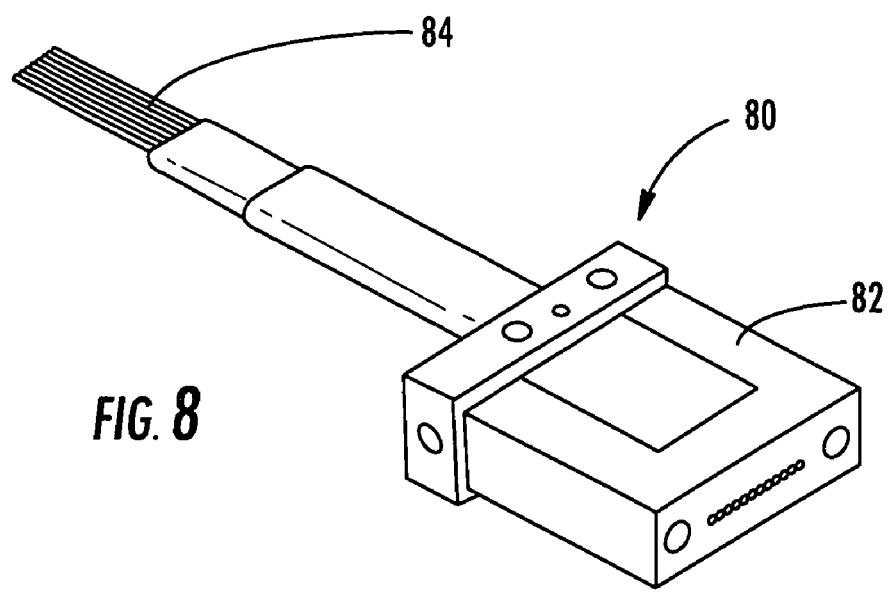
Figure 9:
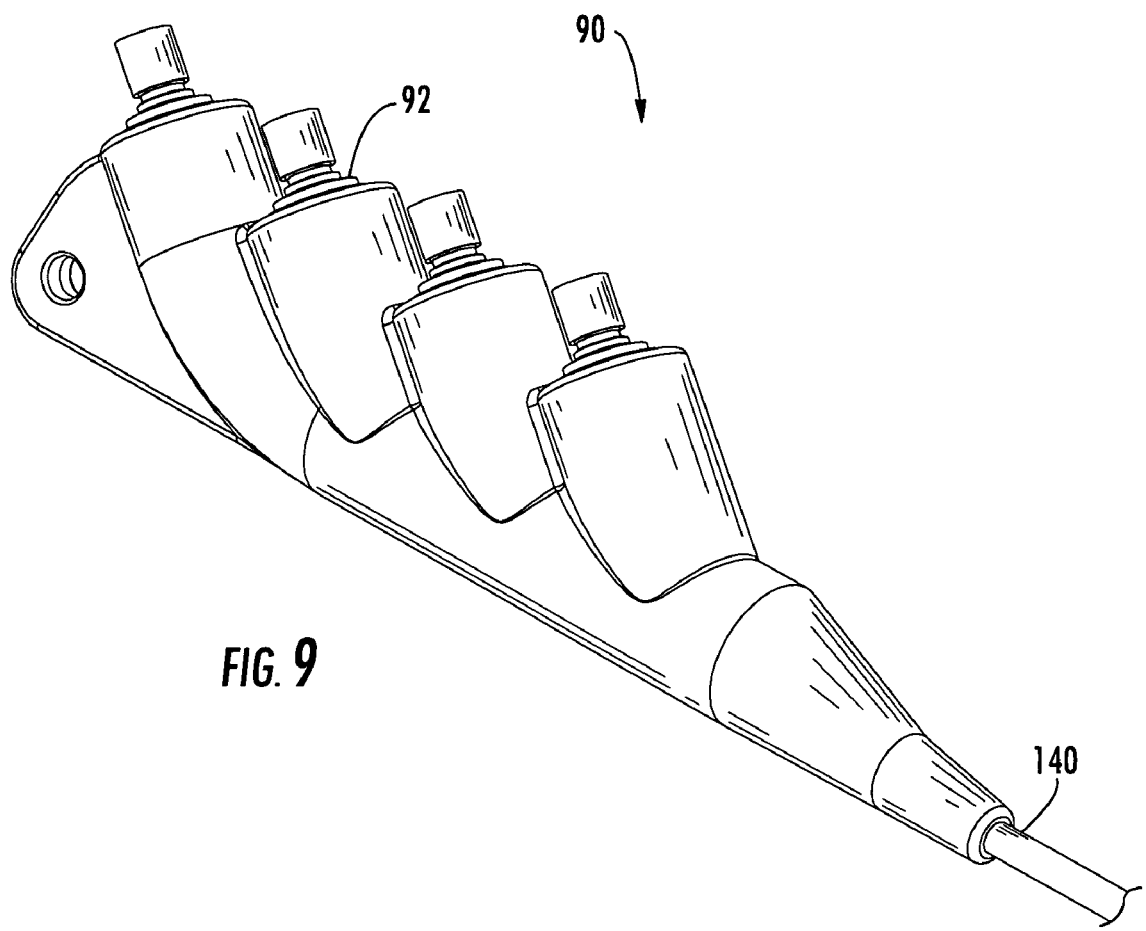
Figure 10:
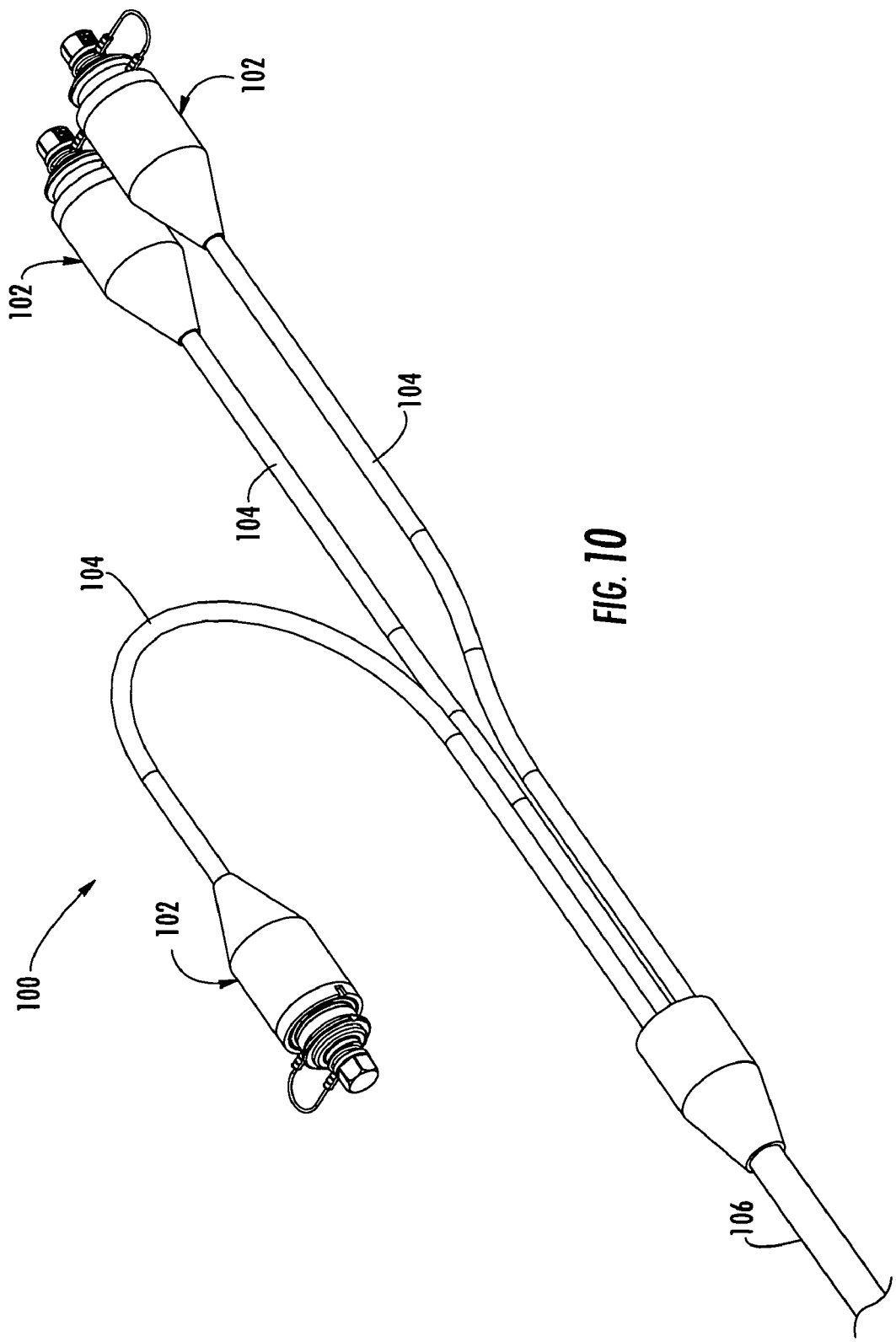

FIGS. 7-10 depicts several different structures that may be in optical communication with optical fibers presented for distribution from fiber optic cables of the present invention, thereby providing connectivity. FIG. 7 depicts a preconnectorized plug assembly 70 that may be spliced to a distribution optical fiber, which then is further protected by other structure. For instance, the cable assembly may have an overmolded portion, a preformed shell, a heat shrink tubing, or other protective component applied after splicing for protecting the access location. Preconnectorized plug assembly 70 includes a tether cable 74 having any suitable length. Likewise, a tether cable 74 without a preconnectorized plug may be spliced to the distribution optical fiber. FIG. 8 depicts a pigtail assembly 80 having a ferrule, more specifically, a multi-fiber ferrule 82 attached to an optical fiber ribbon 84 for optical communication with accessed optical fibers. Moreover, the ferrule may be a portion of a connector, plug, or receptacle for connectivity. FIG. 9 depicts a multiport 90 having a plurality of receptacles 92 attached to the end of tether cable 94. FIG. 10 depicts a branching of a tether cable 106 using furcation legs 104. More specifically, FIG. 10 shows assembly 100 having a plurality of receptacles 102 disposed on the ends of a plurality of furcation legs 104, variations can include plugs instead of receptacles. Of course, other types and/or structures are possible for optical connectivity of the fiber optic cable assembly.

Figure 11:
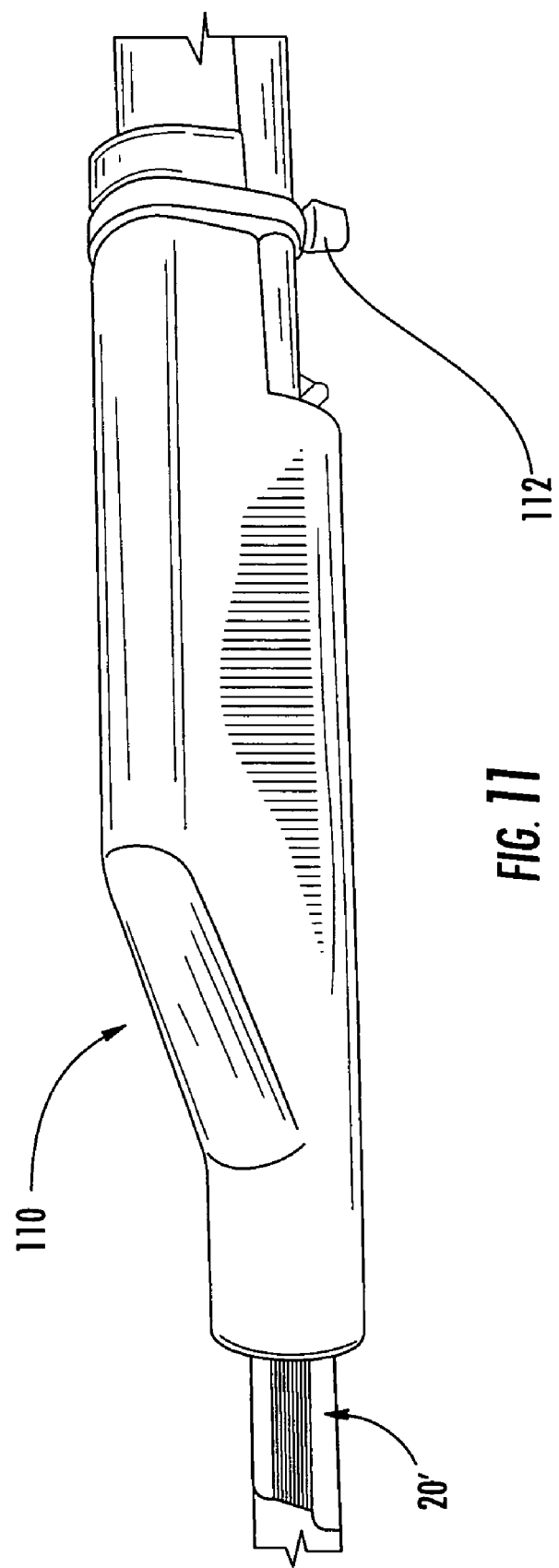
FIG. 11 is perspective view of a portion of an explanatory cable assembly according to the present invention.
Figure 12:
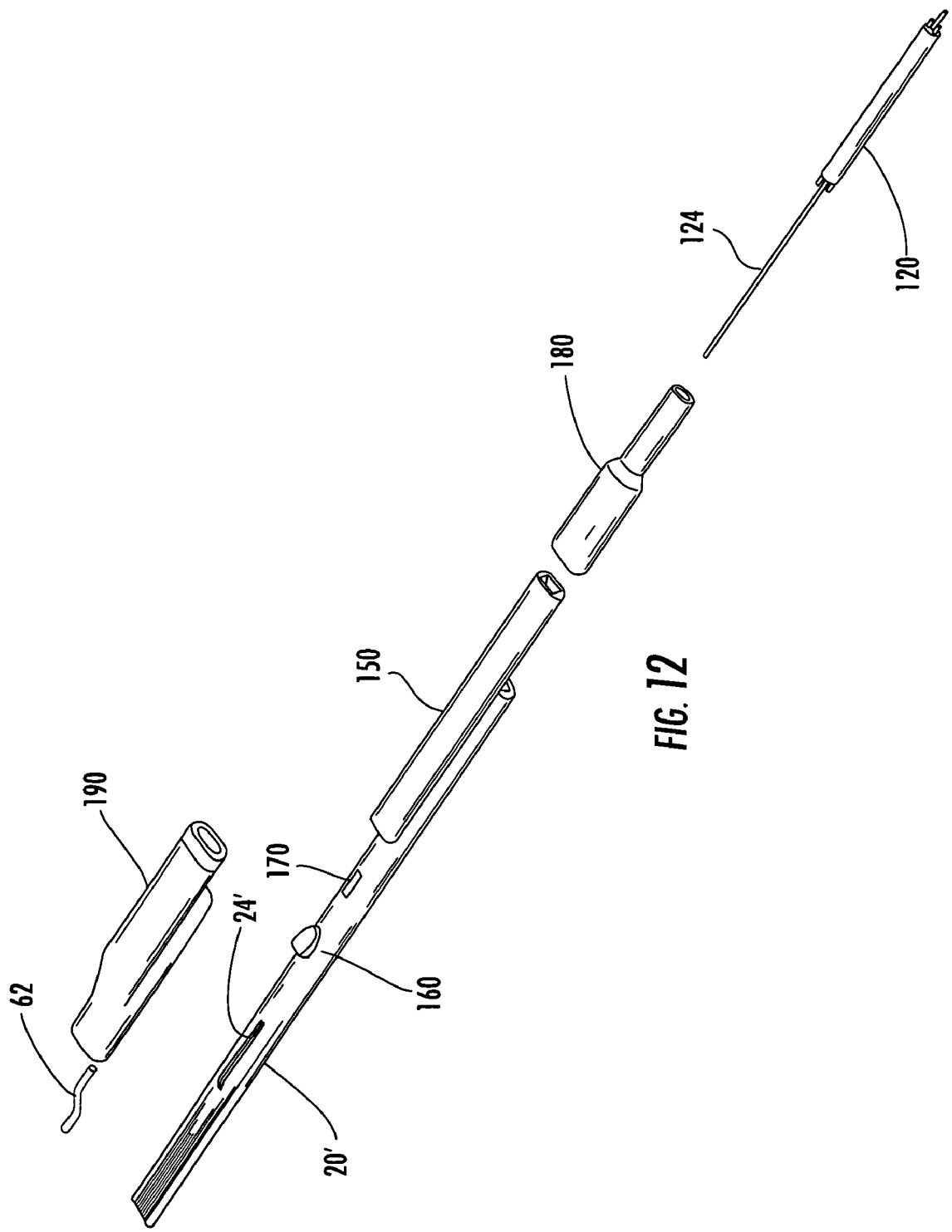
FIG. 12 is a partially exploded view of the cable assembly of FIG. 11.

FIGS. 11 and 12, respectively, depict a perspective and an exploded view of a portion of an explanatory fiber optic cable assembly 110 according to the present invention. As best shown in FIG. 12, cable assembly 110 includes fiber optic cable 20', transition tube 62, a tether cable 120 having a tether optical fiber pigtail 124, an indexing tube 150, an indexing tube plug 160, a splice protector 170, a heat shrink tube 180, and a sealing portion 190. Cable assembly 110 includes indexing tube 150 so that a predetermined amount of excess fiber length (EFL) or excess ribbon length (ERL) can be loaded into the distribution optical fiber/tether optical fiber as will be discussed. Loading ERL or EFL into the distribution optical fiber/tether optical fibers inhibits stresses on the same such as during bending of the cable assembly. Additionally, cable assembly 110 is one example of many different distribution cables according to the present invention, which may include fewer or more components, components having different configurations, different arrangement of components, or the like.

Figure 13:
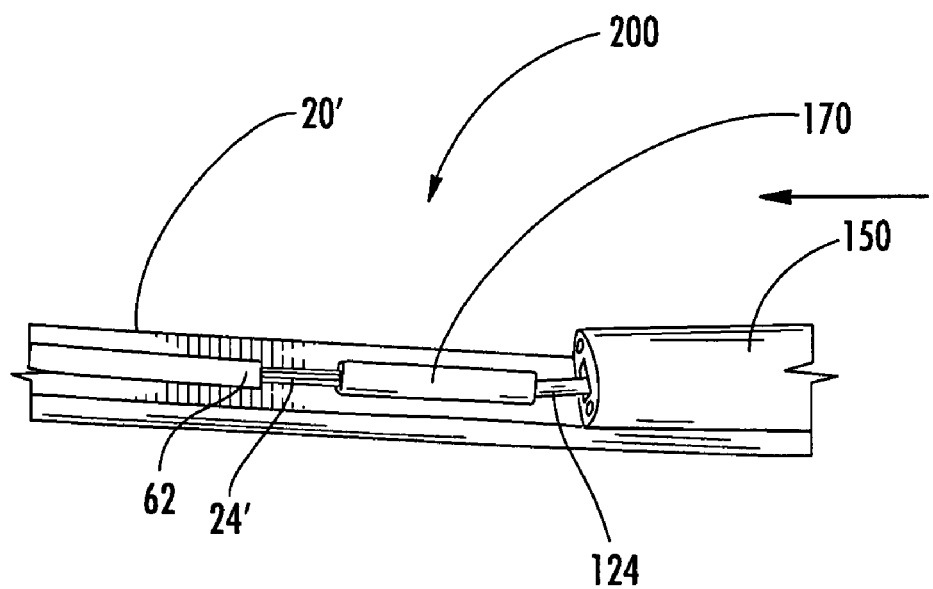
FIGS. 13-15 are perspective views showing the cable assembly of FIG. 11 in various stages of construction.
Figure 14:
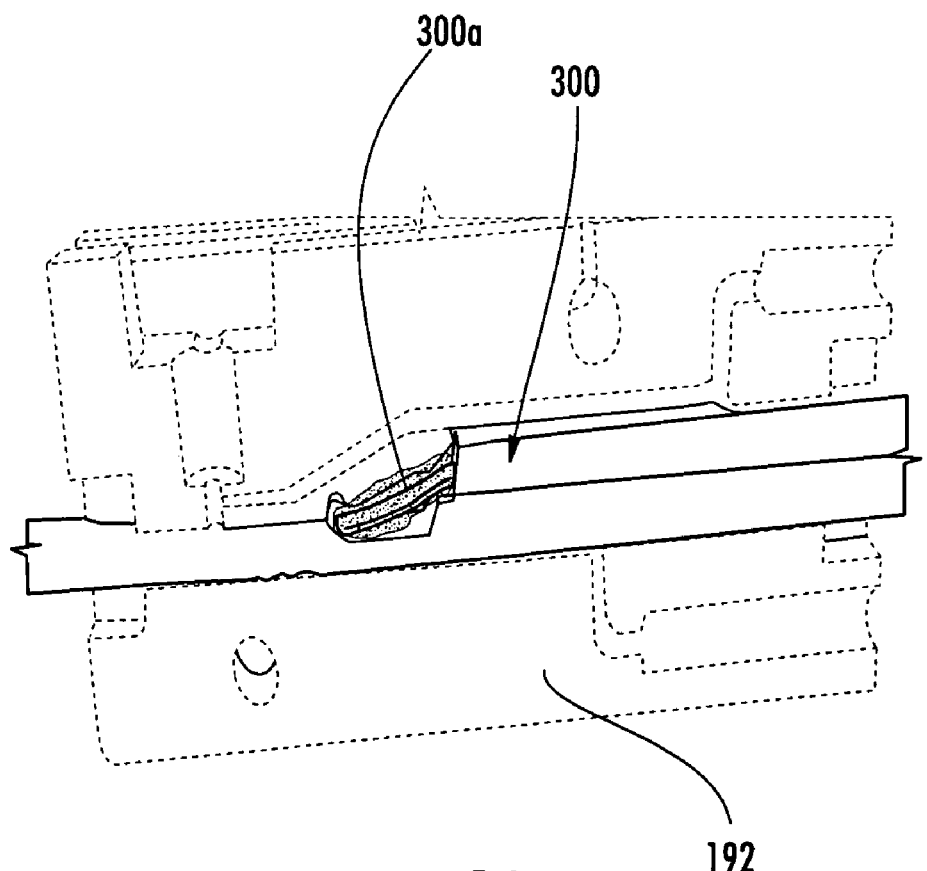
Figure 15:
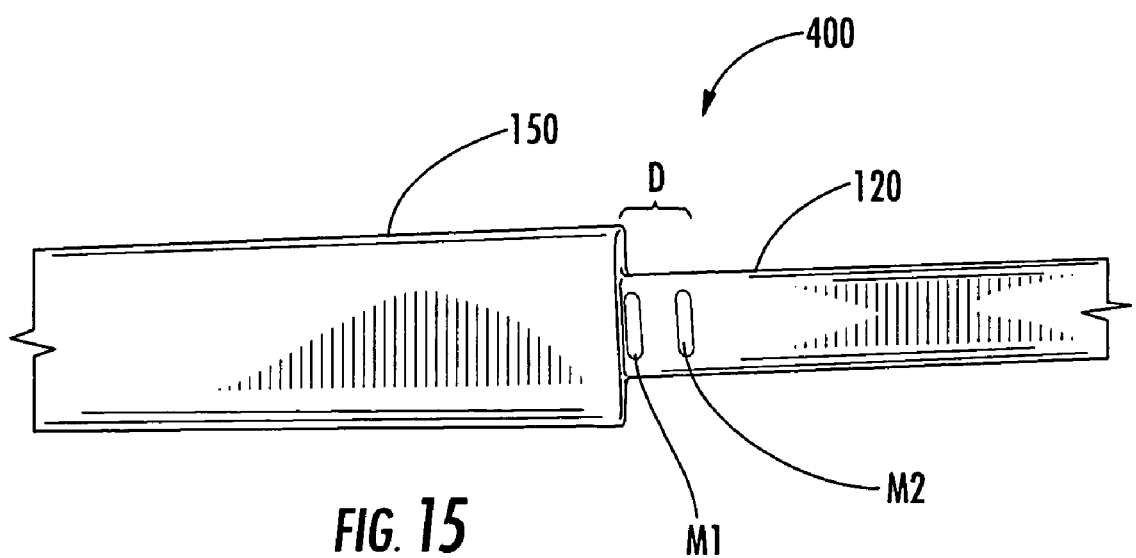

FIGS. 13-15 depict perspective views showing portions of distribution cable 20' in various stages of construction (i.e., subassemblies) for explaining the method of making cable assembly 110. As best shown in FIG. 6, distribution optical fibers 24' are presented outward of fiber optic cable 20' and then transition tube 62 is slid thereover so a portion is disposed within the open compartment, thereby forming a subassembly of cable assembly 110. Thereafter, if desired, demarcation may be applied for closing and/or sealing the compartment. From this subassembly, a variety of distribution cables may be constructed such as cable assembly 110, which may include one or more of the connectivity assemblies shown in FIGS. 7-10. Furthermore, the subassemblies similar to those shown in FIG. 6 or other subassembly constructions are suitable for deployment in the field. Simply stated, the distribution optical fibers 24' of the subassembly are presented outside of the distribution cable and ready for use by the craft in the field. If used in this manner, a tape or other covering may be disposed about the distribution optical fibers and/or access location for protecting the same until access is needed in the field.

FIG. 13 depicts a perspective view of another subassembly 200 of cable assembly 110. More specifically, FIG. 13 shows a subassembly after the splicing of distribution optical fiber 24' of fiber optic cable 20' with tether optical fiber pigtail 124 of tether cable 120 and protecting the splice location with splice protector 170. In other words, tether optical fiber pigtail 124 is in optical communication with distribution optical fiber 24' and becomes part of the same after splicing. Moreover, this step increases the length of the distribution optical fiber based upon the desired connectivity configuration such as the length of the tether cable or other components. Splice protector 170 is used for protecting and immobilizing the splice (not visible) and may be pushed onto tether optical fiber pigtail 124 before splicing and then positioned over the splice after it is made. Likewise other components may be slid over tether optical fiber pigtail 124 depending on the configuration of the embodiment. Like the previous subassembly, a variety of cable assemblies may be constructed from subassembly 200 or other similar subassemblies. Cable assembly 110 includes tether cable 120 with a tether optical fiber stub (the second end of tether optical fiber pigtail 124) for optical connectivity, but other configurations are possible. For instance, the second end of the tether optical fiber 124 can have one or more ferrules attached thereto and the ferrule may be a portion of a receptacle, plug, or the like for plug and play connectivity. As depicted in FIGS. 7-10, the second end of tether cable 120 can have any suitable configuration for connectivity such as a connector or a receptacle having a ferrule, a multi-port or the like, thereby allowing the craft flexibility for downstream connectivity. Of course, other types and/or structures are possible for optical connectivity such as single receptacle or the like. As explained below, cable assembly 110 has the splice disposed within a cavity (not numbered) of indexing tube 150 as will be explained below for protecting the splice and loading an ERL or EFL into the distribution optical fiber/tether optical fiber.

After splicing, indexing tube 150 is slid over a portion of distribution optical fiber 24' and a portion of transition tube 62 as shown by the arrow. Consequently, splice protector 170 is disposed within the cavity (not numbered) of indexing tube 150 and fiber pigtail 124 extends from a second end of indexing tube 150. Furthermore, splice 170 may have an optional cushioning element (not shown) such as a foam tape disposed thereabout. For instance, the foam can be positioned about splice 170 such as folded over the same before indexing tube 150 is slid thereover. Next, optional indexing tube plug 160 (FIG. 12) is then pushed into the upstream end of indexing tube 150. Indexing tube plug 160 is used for inhibiting sealing portion 190 from being injected into indexing tube 150 in a further manufacturing step. Indexing tube plug 160 may be formed from any suitable material such as a foam, soft polymer, or the like and is sized for fitting into the cavity of the indexing tube 150 along with transition tube 62 as a light friction fit. Then, if desired, indexing tube 150 may be taped or secured to fiber optic cable 20' for holding the same in place at a suitable position.

FIG. 14 depicts a perspective view of a subassembly 300 of cable assembly 110 disposed within a mold 192 as shown by the phantom lines before injecting a curable material for forming sealing portion 190. Subassembly 300 further includes a step of applying a material 300a such as a hot melt adhesive for sealing and/or securing components of the assembly together such as fixing the position of transition tube 62. Applying material 300a inhibits the injected material from entering the opening of the compartment, indexing tube 150, and/or from moving components during the overmolding process, thereby preserving optical performance. Additionally, it may be beneficial to heat up a portion of subassembly 300 shortly before forming sealing portion 190 therearound to promote bonding of sealing portion 190 with subassembly 300. Thereafter, subassembly 300 is placed into mold 192 as shown in FIG. 14 and sealing portion 190 is formed by injecting the sealing material into the mold under pressure. Sealing portion 190 provides environment protection for the access location and may provide structural integrity. In this embodiment, sealing portion 190 is a 2-part material formed of isocyanate resin and polyol hardener available from Loctite. In this embodiment, sealing portion 190 has a generally uniform minimum wall thickness of about 3-5 millimeters, but other dimensions are possible. Other methods and/or materials for making sealing portion 190 are possible so long as they meet the requirements of the desired application. Sealing portion 190 can be formed by techniques or manufacturing methods other than by injecting a curable material into a mold. For example, sealing portion 190 may be a preformed shell that fits over subassembly 300 and then has heat (or other reactions) for partially or totally melting and/or forming the same, thereby sealing the access location. In other embodiments, sealing portion 190 can formed from two or more separate portions. In still further embodiments, a ruggedized tubing (not shown) may be placed about the access location and then injected with a suitable material for sealing the ends or the entire ruggedized tubing. If the application allows, sealing portion 190 may also be formed using a heat shrink tubing disposed about the access location.

FIG. 15 depicts a perspective view of a subassembly 400 of cable assembly 110 before tether cable 140 is indexed with respect to indexing tube 150. More specifically, indexing tether cable 140 into and relative to indexing tube 150 enables the loading a predetermined amount of EFL or ERL into distribution optical fiber 24' and/or tether optical fiber pigtail 124. Consequently, the EFL or ERL of the distribution optical fiber inhibits forces from being applied to the same that may cause reliability and/or optical attenuation issues. Cavity (not numbered) of indexing tube 150 is sized so that tether cable 140 fits into the same. Tether cable 140 may include a plurality of strength members disposed on opposite sides of a tether cable cavity 141 that houses a portion of tether optical fiber 124 therein. As explained, tether cable 140 has a generally flat shape, but other sizes and/or shapes for tether cable may be used with the concepts of the present invention. FIG. 15 shows tether cable 140 disposed within a portion of indexing tube 150 and pulled taut for removing excess fiber length as represented by mark M1. Thereafter, tether cable 140 is pushed (i.e., indexed) into indexing tube 150 a predetermined distance D represented by mark M2. In this cable assembly, distance D is about 5 millimeters, thus an EFL of about 5 millimeters is introduced into the distribution optical fiber that generally speaking accumulates within the indexing tube 150. Of course, other suitable distances D may be used for loading the desired EFL or ERL. After indexing occurs tether cable 140 needs to be fixed in position for maintaining the EFL or ERL. Thus, heat shrink tubing 180 is applied over a portion of tether cable 140 and a portion of indexing tube 150 for maintaining the relative positions, but other methods are possible for maintaining relative positions such as overmolding or the like. Of course, variations are possible for cable assembly 110. By way of example, FIG. 11 depicts cable assembly 110 having an optional cable tie 112 for securing indexing tube 150 and sealing portion 190 near the downstream end, thereby inhibiting a separation force between the two.

It will be apparent to those skilled in the art that various modifications and variations can be made to the present invention without departing from the spirit and scope of the invention. For instance, fiber optic cables can have a plurality of tubular components disposed between strength components and embedded in the cable jacket material; however, this may increase the difficulty for removing and accessing the tubular components. Thus, it is intended that the present invention cover the modifications and variations of this invention provided they come within the scope of the appended claims and their equivalents.

What is claimed is:

1. A fiber optic cable, comprising:
a plurality of optical fibers;
a first strength component and a second strength component that are generally aligned along a neutral axis of the fiber optic cable;
a cable jacket, the cable jacket surrounding the first strength component and the second strength component and defining a plurality of compartments disposed in a generally flat array between the first strength component and the second strength component, wherein the plurality of compartments respectively house one or more of the plurality of optical fibers; and
at least one access feature provided on the cable jacket for individually opening one or more of the plurality of compartments for accessing one of the optical fibers therein.

2. The fiber optic cable according to claim 1, at least one of the plurality of optical fibers extending from its respective compartment at an access location and having a demarcation point.

3. The distribution fiber optic cable assembly of claim 1, further including a transition tube, wherein the transition tube protects one or more of the plurality of optical fibers that extends from its respective compartment for distribution.

4. The fiber optic cable according to claim 1, further comprising a distribution guide, wherein the distribution guide is disposed about the fiber optic cable at an access location.

5. The fiber optic cable according to claim 1, further comprising a distribution guide, wherein the first strength component and the second strength component are electrically conductive and the distribution guide includes at least one insulation displacement contact for electrical connection with one of the strength components near an access location.

6. The fiber optic cable according to claim 1, the fiber optic cable being a portion of cable assembly, wherein one of the plurality of optical fibers is in optical communication with a tether optical fiber for distribution.

7. The fiber optic cable according to claim 1, the fiber optic cable being a portion of cable assembly that further includes an indexing tube for creating excess fiber length for a distribution optical fiber.

8. The fiber optic cable according to claim 1, further being a distribution cable assembly including one connectivity component selected from the group consisting of a ferrule, receptacle, or a plug.

9. The fiber optic cable according to claim 1, further comprising at least one water-swellable component.

10. The fiber optic cable according to claim 1, further including a plurality of tubular components for housing the plurality of optical fibers.

11. The fiber optic cable according to claim 1, wherein the at least one access feature provided on the cable jacket is a removable window.

12. The fiber optic cable according to claim 1, wherein the plurality of optical fibers shift positions within the fiber optic cable.

13. The fiber optic cable according to claim 1, wherein the cable has a plurality of access locations.

14. The fiber optic cable according to claim 1, wherein some of the plurality of optical fibers extend for less than the entire length of the fiber optic cable.

15. The fiber optic cable according to claim 1, wherein the plurality of compartments of the cable jacket are arranged in multiple generally linear rows.

16. A fiber optic cable, comprising:
a first strength component and a second strength component;
a plurality of tubular components, the plurality of tubular components arranged generally between the first strength component and the second strength component in one or more generally flat arrays and some of the plurality of tubular components include at least one optical fiber;
a cable jacket surrounding the plurality of strength components and the plurality of tubular components, wherein the cable jacket has a compartment adjacent to the first strength member and more than one of the plurality of tubular components rotate into the compartment along a length of the fiber optic cable.

17. The fiber optic cable according to claim 16, at least one of the tubular components extending from the compartment at an access location and having a demarcation point.

18. The fiber optic cable according to claim 16, further comprising a distribution guide wherein the distribution guide is disposed about the fiber optic cable at an access location.

19. The fiber optic cable according to claim 16, further comprising a distribution guide, wherein the first strength component and the second strength component are electrically conductive and the distribution guide includes at least one insulation displacement contact for electrical connection with one of the strength components near an access location.

20. The fiber optic cable according to claim 16, the fiber optic cable being a portion of cable assembly, wherein the at least one optical fiber is in optical communication with a tether optical fiber.

21. The fiber optic cable according to claim 16, the fiber optic cable being a portion of cable assembly that further includes an indexing tube for creating excess fiber length for a distribution optical fiber.

22. The fiber optic cable according to claim 16, further being a distribution cable assembly including one connectivity component selected from the group consisting of a ferrule, receptacle, or a plug.

23. The fiber optic cable according to claim 16, further comprising at least one water-swellable component.

24. The fiber optic cable according to claim 16, wherein the total number of tubular components along the length of the fiber optic cable decreases.

25. The fiber optic cable according to claim 16, wherein the fiber optic cable excludes tubular component stranding.

26. The fiber optic cable according to claim 16, wherein the cable has a plurality of access locations.

27. The fiber optic cable according to claim 16, wherein the plurality of compartments of the cable jacket are arranged in multiple generally linear rows.

28. A distribution fiber optic cable assembly, comprising:
a plurality of optical fibers;
a first strength component and a second strength component;
a cable jacket, the cable jacket surrounding the first and second strength components and defining a plurality of compartments disposed in one or more generally flat arrays, wherein the plurality of compartments respectively house one or more of the plurality of optical fibers; and
at least one of the plurality of optical fibers protruding from the cable jacket at a demarcation point, thereby defining the at least one distribution optical fiber.

29. The fiber optic cable according to claim 28, further comprising a distribution guide wherein the distribution guide is disposed about the fiber optic cable at an access location.

30. The fiber optic cable according to claim 28, further comprising a distribution guide, wherein the first strength component and the second strength component are electrically conductive and the distribution guide includes at least one insulation displacement contact for electrical connection with one of the strength components near an access location.

31. The distribution fiber optic cable assembly of claim 28, the fiber optic cable being a portion of cable assembly, wherein the at least one distribution optical fiber is in optical communication with a tether optical fiber.

32. The distribution fiber optic cable assembly of claim 28, further including at least one connectivity node being selected from the group consisting of a ferrule, receptacle, or a plug that is in optical communication with the at least one distribution optical fiber.

33. The distribution fiber optic cable assembly of claim 28, further including a transition tube, wherein the transition tube protects the at least one distribution optical fiber and the demarcation point is disposed about the transition tube.

* * * * *